(12) United States Patent
Salazar et al.

(10) Patent No.: US 9,635,054 B2
(45) Date of Patent: Apr. 25, 2017

(54) SECURING COMMUNICATION WITHIN A NETWORK ENDPOINT

(71) Applicant: Landis+Gyr Innovations, Inc., Alpharetta, GA (US)

(72) Inventors: Ruben Salazar, Johns Creek, GA (US); Stephen Chasko, Marietta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 134 days.

(21) Appl. No.: 14/045,103

(22) Filed: Oct. 3, 2013

(65) Prior Publication Data

US 2015/0101016 A1    Apr. 9, 2015

(51) Int. Cl.
*H04L 29/06* (2006.01)
*H04L 29/08* (2006.01)

(52) U.S. Cl.
CPC ............ *H04L 63/164* (2013.01); *H04L 63/04* (2013.01); *H04L 63/08* (2013.01); *H04L 67/12* (2013.01)

(58) Field of Classification Search
CPC ......... H04B 3/54; H04L 63/045; H04L 63/04; H04L 63/08; H04L 63/164; H04L 67/12
See application file for complete search history.

(56) References Cited

U.S. PATENT DOCUMENTS

| | | | |
|---|---|---|---|
| 2006/0206433 A1 | 9/2006 | Scoggins | |
| 2006/0288209 A1* | 12/2006 | Vogler | H04L 9/0844 713/168 |
| 2010/0060479 A1* | 3/2010 | Salter | G01D 4/002 340/870.4 |
| 2012/0137126 A1* | 5/2012 | Matsuoka | H04L 9/0838 713/156 |
| 2013/0254881 A1* | 9/2013 | Helmschmidt | G01D 4/004 726/22 |

(Continued)

FOREIGN PATENT DOCUMENTS

| | | |
|---|---|---|
| EP | 2506392 | 10/2012 |
| EP | 2648170 | 10/2013 |
| WO | 2015084468 | 6/2015 |

OTHER PUBLICATIONS

Kim et al.; A Secure Smart-Metering Protocol Over Power-Line Communication; 2011; Retrieved from the Internet <URL: ieeexplore.ieee.org/xpls/abs_all.jsp?arnumber=5951817>; pp. 1-10.*

(Continued)

*Primary Examiner* — Oleg Korsak
(74) *Attorney, Agent, or Firm* — Kilpatrick Townsend & Stockton LLP

(57) ABSTRACT

Systems and methods for securing communication within a network endpoint, for example, a meter. The meter may include a communication module and a metrology module where the modules are connected via a communication path that is external to both modules. The modules exchange a pairing key to establish a paired channel of communication. When the communication module receives a communication through a network for establishing a secure channel to the endpoint, the communications module sends some or all of the security data to the metrology module to establish a secure communication from a head-end system through the communication module to the metrology module.

18 Claims, 6 Drawing Sheets

(56) References Cited

U.S. PATENT DOCUMENTS

2013/0320776 A1* 12/2013 Cook .......................... 307/126

OTHER PUBLICATIONS

Ye et al.; A secure and reliable in-network collaborative communication scheme for advanced metering infrastructure in smart grid; 2011; Retrieved from the Internet <URL: ieeexplore.ieee.org/xpls/icp.jsp?arnumber=5779257&tag=1>; pp. 1-66 as printed.*
Arkko et al.; RFC 3830—MIKEY: Muyltimedia Internet KEYing; 2004; Retrieved from the Internet <URL: tools.ietf.org/html/rfc3830>; pp. 1-66 as printed.*
M. Euchner; RFC 4650—HMAC-Authenticated Diffie-Hellman for Multimedia Internet KEYing (MIKEY); Retrieved from the Internet <URL: tools.ietf.org/html/rfc4650>; pp. 1-27 as printed.*
Sarikaya et al.; Framework for Securely Setting Up Smart Objects draft-sarikaya-solace-setup-framework-00; Sep. 2012; Retrieved from the Internet <URL: tools.ietf.org/html/draft-sarikaya-solace-setup-framework-00>; pp. 1-18 as printed.*
PCT/US2014/056875, "International Search Report and Written Opinion", Jul. 10, 2015, 11 pages.
International Application No. PCT/US2014/056875,International Preliminary Report on Patentability mailed on Apr. 14, 2016, 8 pages.

* cited by examiner

SECURING COMMUNICATION WITHIN A NETWORK ENDPOINT

TECHNICAL FIELD

This disclosure relates generally to data communications and more particularly relates to securing communications within a network endpoint.

BACKGROUND

A metering network may be used to communicate between a resource provider and devices that monitor and control resources, such as electricity, in a home or other location. An example is an electric utility company and the meters located at their customer's houses or businesses. Utility companies and other resource providers may use a metering network to monitor, control, and measure the consumption of resources by consumers. Secure communications between and within devices in a metering network is crucial to allow accurate and uninterrupted operation of the metering network.

The flow of communication in a metering network may be from a head-end system through collectors, routers, and other meters to a meter or endpoint at a specified location. Having many network entry points can increase exposure to potential attackers. If left unsecured, entry points are vulnerable to tampering that might allow an attacker to penetrate the network, gain access to control software, and alter load conditions to destabilize the distribution grid. Previous solutions for providing security in a metering network cover the network from the head-end system to the endpoint or meter at a specified location. Meters may be vulnerable to tampering since they are geographically dispersed and may not provide secure communication within the endpoint or meter. Accordingly, systems and methods are desirable for providing secure communication within an endpoint that does not impact the flow of secure communication in the metering network.

SUMMARY

Systems and methods are disclosed for providing secure communication within an endpoint that does not impact the flow of secure communication in a metering network. An exemplary method includes receiving a communication through a network by a communication module, the communication containing security data sent to a meter for establishing a secure channel through the network to the meter. The meter includes a communication module and a metrology module externally linked via a communication path. A paired channel is provided through the communication path through the use of a pairing key. The exchange of security data between a head-end system and the communication module and the exchange of the same or similar data between the communication module and the metrology module ensures secure communication within the meter and avoids any impact to the flow of communication in the metering network.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
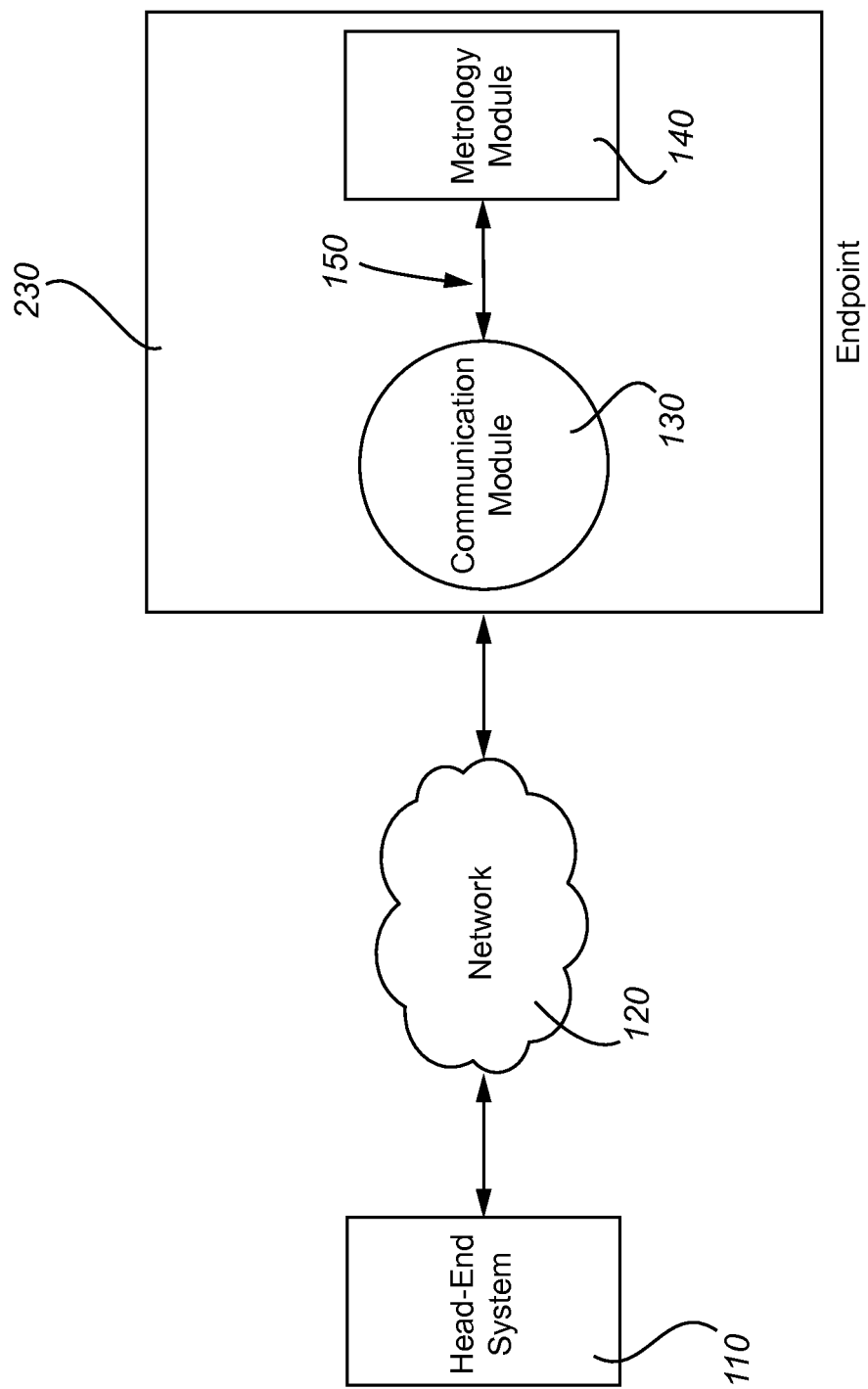
FIG. 1 is a diagram illustrating a metering network from head-end system to an endpoint.

Systems and methods are provided for securing communication within an endpoint in a network. Though an endpoint may be designed to be a final node in a network, communication within the endpoint must also be secured. This is of primary importance when modules within the endpoint are connected via a communication path that is external to the modules. An example of an endpoint is a meter. The purpose of a meter is to control, monitor and measure the consumption of a resource by a consumer. In addition, today's meters also must have the functionality to receive and respond to commands transmitted over the network. To do this, a meter may include separate modules. One module, the communication module, performs the functions needed for data communication across the network. Another module, the metrology module, performs the functions needed to control, monitor and measure the consumption of a resource. The metrology module and the communication module may be connected via a communication path that externally links these two modules. One communication module may be connected to one or more metrology modules. The communication module and each of the metrology modules may be on separate electronic boards linked through a board socket. Alternatively, the communication module and each of the metrology modules may be connected through a communication cable or other external conductor.

An endpoint or meter may be controlled by a head-end system. A head-end system enables a user to remotely program meters, schedule time-of-use periods and rates, handle remote disconnects, analyze critical peak usage, view load control indices, and perform other day-to-day functions. To accurately do this, the channel over the network that the head-end system uses to communicate with the meter must be a secure channel. The secure channel over the network is established by the exchange of security data between the head-end system and the endpoint. The security data may include various cryptographic keys used for encryption/decryption of data, validation of data, and authentication of data. This secure channel that is set-up between the head-end system and the endpoint is extended to any communication within the endpoint.

In an example of the present invention, the endpoint or meter includes a communication module connected to one or more metrology modules. The communication module is linked to each metrology module via a communication path that is external to both modules. If the communication module and a metrology module are on separate circuit boards, the communication path may be a board socket. In another embodiment of the present invention, the communication module and a metrology module may be housed in separate units and the communication path may be a cable.

Since the communication module and each of the metrology modules are externally connected via a communication path, a secure channel must be set up on the communication path to guarantee secure communication between the communication module and any of the metrology modules. During manufacturing of the meter the pairing key may be injected into the modules. If the pairing key is injected during manufacture, an acknowledgement between the communication module and each of the metrology modules may be performed to confirm that a pairing key has been established. Alternatively, during installation or initialization of the meter, a pairing key may be exchanged between the communication module and each of the metrology modules. Exchange of the pairing key assures that communication originates or is received by the original modules that exchanged the pairing key. A pairing key could be a keyed-hash message authentication code, HMAC, key for integrity checks and/or a 256 AES key for encryption. A SHA256 keyed HMAC key would be an example of a key used for an integrity check. The pairing key assures confidentiality between the communication module and the metrology module. This is of importance since these modules are linked via an external link that can be tapped. In addition, since these modules may be separate, either on separate boards or in separate housings, any one of the modules may be replaced. Therefore, use of the pairing key to secure a paired channel on the external link between the communication module and any of the metrology modules assures that reliable communication is maintained during the operation of the meter.

Through the use of secure data exchanged between the head-end system and the meter, a secure channel may be established through the network between the head-end system and the endpoint, specifically between the head-end system and the communication module of the endpoint. This secure channel is extended within the meter by the exchange of identical or similar secure data between the communication module and the endpoint transmitted via the paired channel. The extension of the secure channel within the endpoint does not affect the flow of any communication between the head-end system and the endpoint. This aspect of the present invention helps detect tampering with the modules or the communication path at the meter.

The present invention will now be described with reference to the accompanying drawings, in which exemplary embodiments of the invention are shown. Examples are shown having a communication module connected to a metrology module. Note that this configuration may be extended to include a communication module connected to one or more metrology modules. This present invention is described by explaining the exchange of information between one communication module and one metrology module. This functionality can be duplicated to include exchange of information between the communication module and any one of the metrology modules.

FIG. 1 is a diagram illustrating a metering network. A metering network may include a head-end system 110 communicating over a network 120 to an endpoint 230. Head-end system 110 is the controller of the metering network. It provides command and control over the network, delivering the analytics-based information utilities need to manage the distribution of resources. The head-end system 110 may be a software platform that allows data reporting and system control. A head-end system may operate over any type of wired or wireless network including but not limited to, RF mesh, PLC (Power Line Carrier) and cellular networks. It enables a user to remotely program endpoints, schedule time-of-use periods and rates, handle remote disconnects, analyze critical peak usage, view load control indices, and perform other day-to-day functions. In addition, the head-end system 110 may manage the meter data collected from many endpoints, validating each data element.

Figure 2:
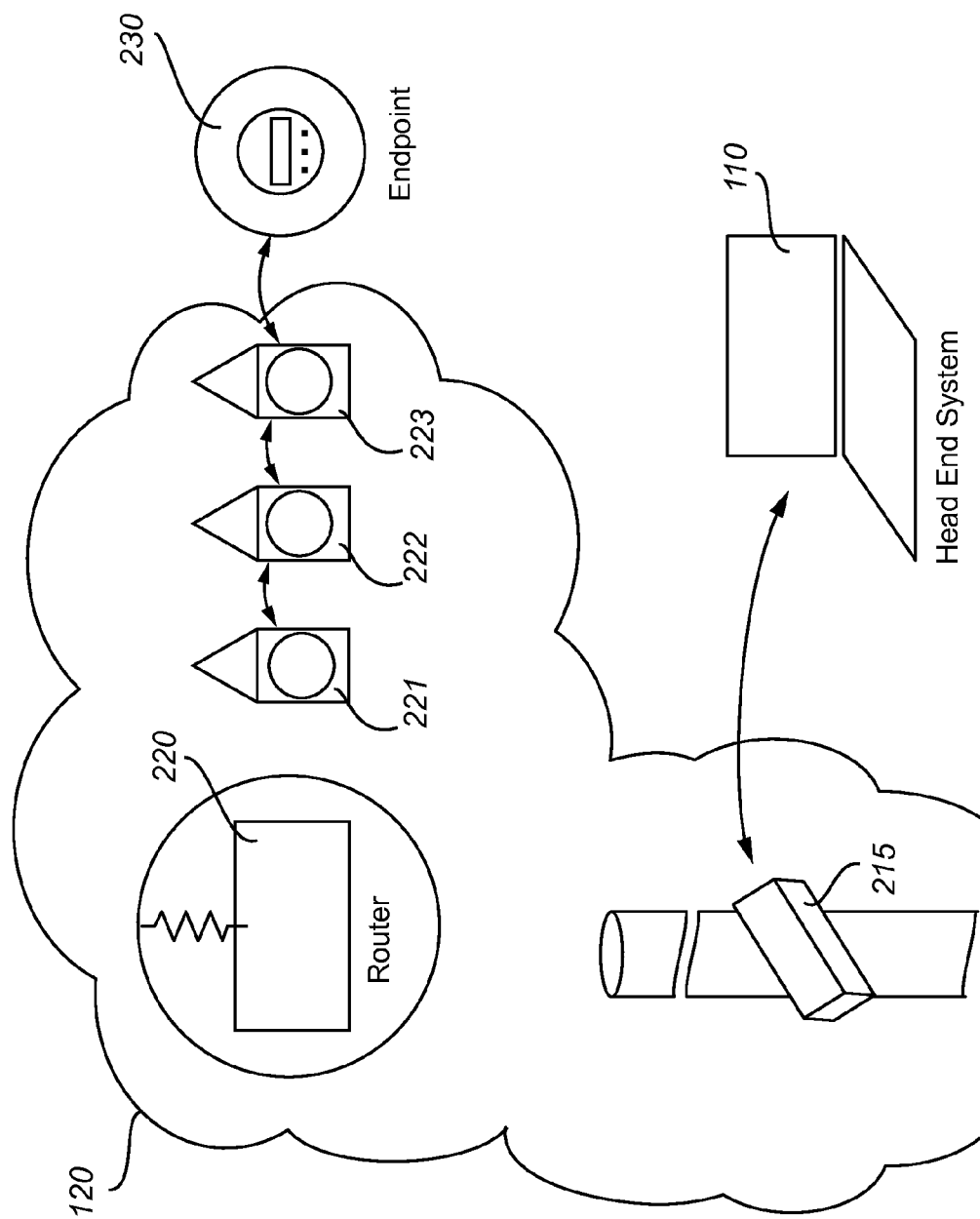
FIG. 2 is a metering network illustrating the network from a head-end system or controller to an endpoint.

Referring to FIG. 2, the network 120 that the head-end system may utilize to communicate to an endpoint may include devices such as collectors 215, routers 220, and other endpoints, 221-223. Communication may proceed utilizing any appropriate protocol and any appropriate network configuration. Protocols include, but are not limited to the 802.15.4, PRIME, G3, and TCP/IP protocols. Several endpoints may transmit data to a router 220. The router 220, in turn, may route data to a collector 215 in the network. A collector may receive data from multiple routers. The collector 215 communicates with the head-end system 110. The head-end system may receive and send information to multiple collectors.

The endpoints such as endpoint 230 may be meters that are usually in geographically dispersed locations such as homes or businesses. The meters are used to monitor a resource such as electricity, water, or natural gas. Meters measure the usage of the resource. Some meters may be smart meters that support a variety of service commands. These service commands may allow utilities to disconnect, or limit service remotely or manually at the meter. In addition, some meters may store an event log that contains entries of functions the meter has performed. Service commands may originate from the head-end system and are sent via the network to endpoints.

Figure 3:
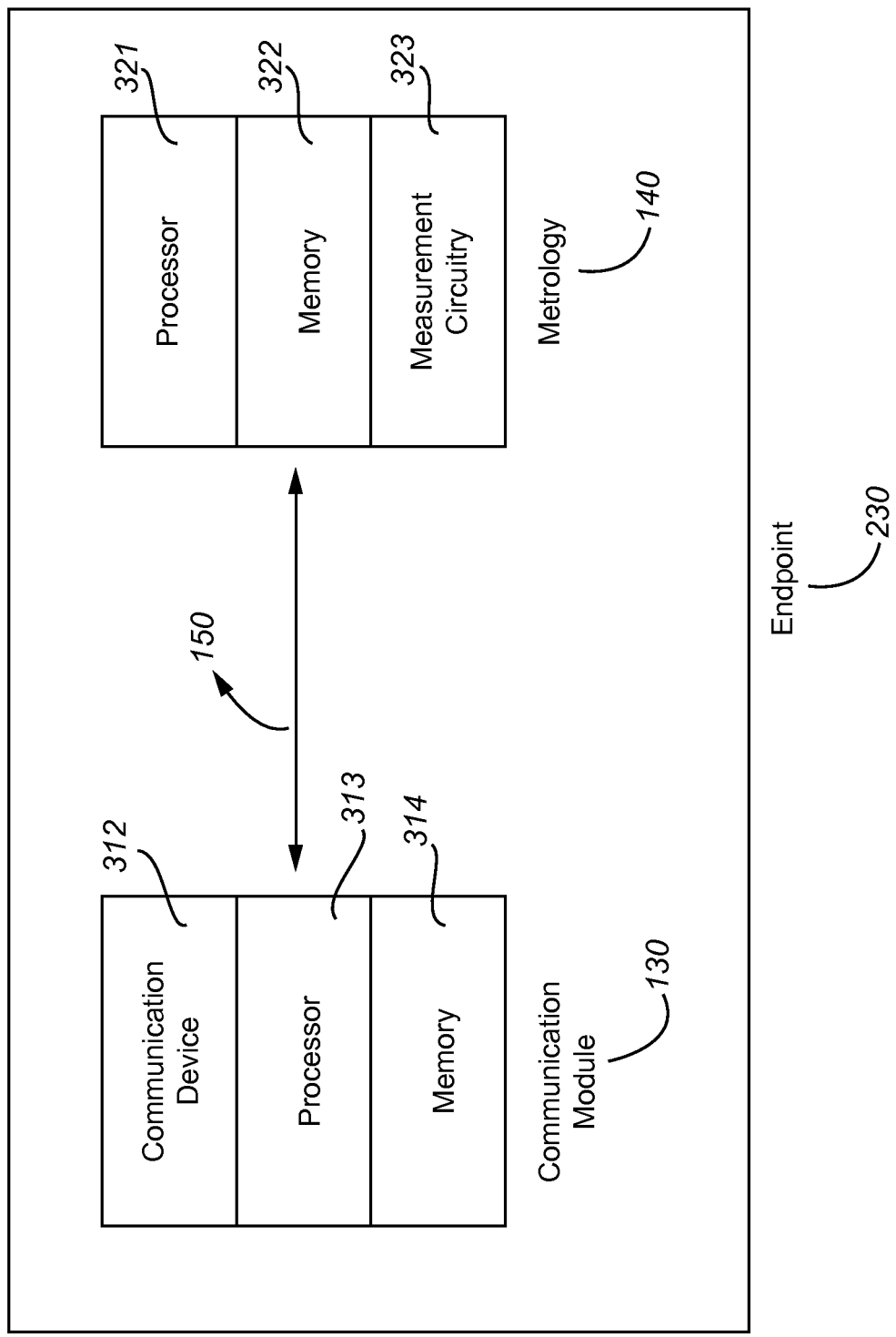
FIG. 3 is a diagram illustrating an endpoint with a communication module and a metrology module.

Referring to FIG. 3, an endpoint 230 may include two modules, a communication module 130 and a metrology module 140 that are externally linked via a communication path 150. These two modules may be housed in the same unit on separate boards hence the communication path 150 may be an on board socket. Alternatively, the modules may be housed separately and thus the communication path 150 may be a communication cable or other conductor. Since these two components may be physically separate, the communication module 130 and the metrology module 140 may be removed or replaced independent of each other. The function of the communication module 130 is to receive and send messages through the network 120. The function of the metrology module is to provide the functions necessary to manage the resource, in particular to measure the resource used. The communication module 130 may include a communication device 312 such as an antenna and a radio. Alternatively the communication device 312 may be any device that allows wireless or wired communication. The communication module may also include a processor 313, and memory 314. The communication device 312 is used to receive and send messages through the network 120. The processor 313 controls functions performed by the communication module 130 and the processor 313 utilizes memory 314 as needed. The second component of the endpoint 230 is the metrology module 140. The metrology module 140 may include a processor 321, memory 322, and measurement circuitry 323. The processor 321 in the metrology module 140 controls functions performed by the metrology module 140 and utilizes the memory 322 as necessary. The measurement circuitry 323 handles the measuring of the resource and may also handle the recording of measurements taken. Both the communication module and the metrology module may include computer executable instructions stored in memory or in another type of computer-readable medium and one or more processors within the modules may execute the instructions to provide the functions described herein.

During manufacture or installation or initialization of a meter or endpoint 230, a pairing key 450 is exchanged between the communication module and the metrology module. If the pairing key is set during manufacture, it may be injected into the modules. Alternatively, if the pairing key is not set during manufacture, the exchange is performed through the transmission of the pairing key between these two modules via the communication path 150. Once the pairing key 450 is exchanged, a paired channel on the communication path is established between the communication module and the metrology module. In a configuration where there are multiple metrology modules, a pairing key is exchanged between the communication module and each of the metrology modules. This pairing key may be the same for each of the metrology modules or may be a different key for each of the modules. Hence, data that is exchanged utilizing the pairing key is transmitted via the pairing channel of the communication link. The pairing channel assures secure communication between a specific communication module and a specific metrology module, and thus prevents the unauthorized tampering or replacement of either the communication module or the metrology module. In addition, data that is not required to be secure may also be transmitted on the communication path. This data would be transmitted without a pairing key and hence would not use the pairing channel.

Communication through the network may be initiated by the head-end system 110. A communication from the head-end system is transmitted through the network 120 to a specified endpoint 230. The communication is routed through network 120 until it is received by the specified endpoint 230. Specifically, the request is received by the communication module 130 of endpoint 230. The communication module receives and handles the communication as appropriate. This may include validating that the communication is from a valid head-end system and acknowledging the request by responding to the request with an appropriate message that is sent to the head-end system.

Figure 4:
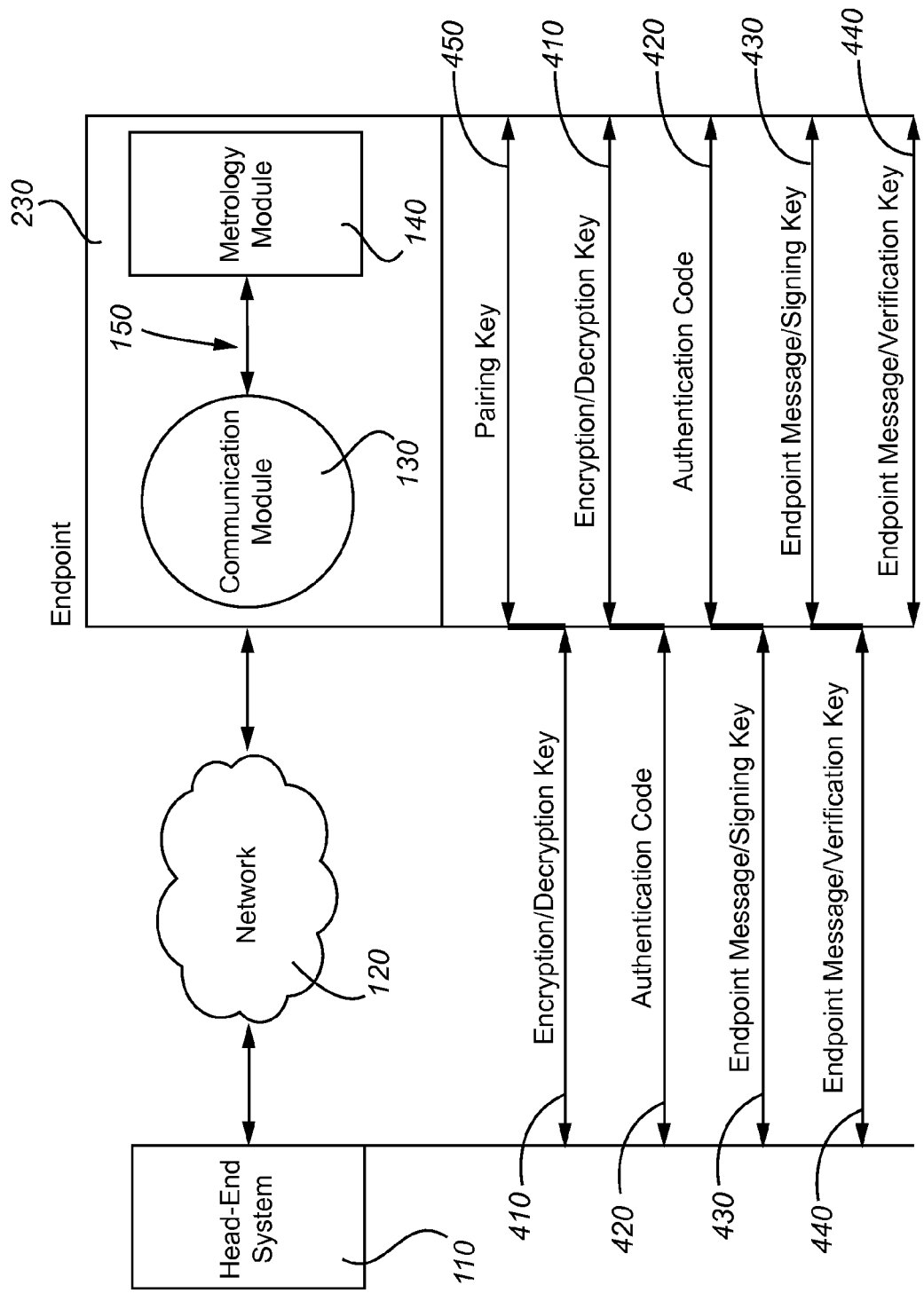
FIG. 4 is a diagram illustrating the exchange of keys between a head-end system and an endpoint, and between the communication module and the metrology module in the endpoint.

In an embodiment of this invention, the communication transmitted may include a request to set up a secure channel between the head-end system 110 and the endpoint 230 using the network 120. This may be performed by the exchange of security data. In an embodiment of this invention, security data may be keying data which may include various cryptographic keys exchanged between the head-end system 110 and the communication module 130. As shown in FIG. 4, these keys may include an encryption/decryption key 410 to allow the encryption of messages, an integrity key such as authentication code 420, an endpoint message signing key 430 to assure messages were received by the endpoint, and an endpoint message verification key 440 to verify that messages originate from a valid endpoint. Once the exchange of security data is performed between the communication module 130 and the head-end system 110, a secure channel is set up through the network 120 between the head-end system 110 and the communication module 130. For example, a message from the head-end system 110 to the endpoint 230 to change the configuration of the device would be signed by the head-end system 110 using an endpoint message/signing key 430 and verified by the endpoint 230 using an endpoint message/verification key 440 before allowing the configuration to occur. The signing key could be an Elliptic Curve Digital Signature Algorithm (ECDSA) signature key sent from the head end system 110 and an ECDSA verification key used for verification on the endpoint 230.

To extend the secure channel to the metrology module within the endpoint, the communication module 130 and the metrology module 140 exchange the security data. For example, keying data such as the encryption/decryption key 410 that is sent by the head-end system 110 and is received by the communication module 130 is exchanged between the communication module 130 and the metrology module 140 via the paired channel. Likewise, an integrity key such as an authentication code 420 to assure that the data exchanged is unaltered, the endpoint message signing key 430 and the endpoint message verification key 440 that is exchanged between the head-end system 110 and the communication module 130 of the endpoint 230 is also exchanged between the communication module 130 and the metrology module 140 via the paired channel. Keying data can be used for confidentiality of data exchanged, such as a AES 256 key, and also for integrity or authentication of the data exchanged, such as a SHA256 keyed HMAC key. This aspect of the exchange of the same or similar security data within the endpoint 230 allows for secure communication within the endpoint 230 without requiring any changes to the head-end system 110.

To ensure the efficient transfer of messages between the communication module 130 and the metrology module 140, a security mechanism can be implemented where the same or similar security data exchanged between the head-end system 110 and the communication module 130 of the endpoint 230 may be exchanged between the communication module 130 and the metrology module 140. Similarly, in a configuration where there are multiple metrology modules connected to a communication module, the security mechanism would be implemented between the communication module and each of the metrology modules by the exchange of the same or similar security data exchanged between the head-end system and the communication module. This security mechanism, which comprises of a further exchange of security data, facilitates the exchange of information between the communication module 130 and the metrology module 140 because network data messages received from the head-end system 110 can pass through with minimal processing from the communication module 130 to the metrology module 140. Likewise, metrology data messages originating at the metrology module 140 can be sent by the communication module 130 over the secure channel of the network 120 with little or no processing by the communication module. Alternatively, the communication module may process messages from the head-end system to determine whether to send the messages to the metrology module. For example, the communication module can verify the signature on a message. If the signature verification fails when checked by the communication module, the communication module may not send the message to the metrology module and may either ignore the message or send a reply message indicating a failed signature comparison. In another example, the communication module can determine when a message received is relevant to the metrology module. By the exchange of keys, the communication module and the metrology module can implement the same security mechanism; therefore, this message can be directly passed to the metrology module without the communication module performing any key verification. The metrology module would perform the signature comparison and any other key verification needed. Also, note that the set-up and use of extending the secure channel within the endpoint 230 is transparent to the head-end system 110. That is, the head-end system 110 communicates to the endpoint 230 as originally set up. The head-end system may not know whether the communication module 130 and the metrology module 140 have exchanged security data. This is advantageous because no change is necessary to the head-end system 110 to incorporate secure communication within the endpoint 230.

Figure 5:
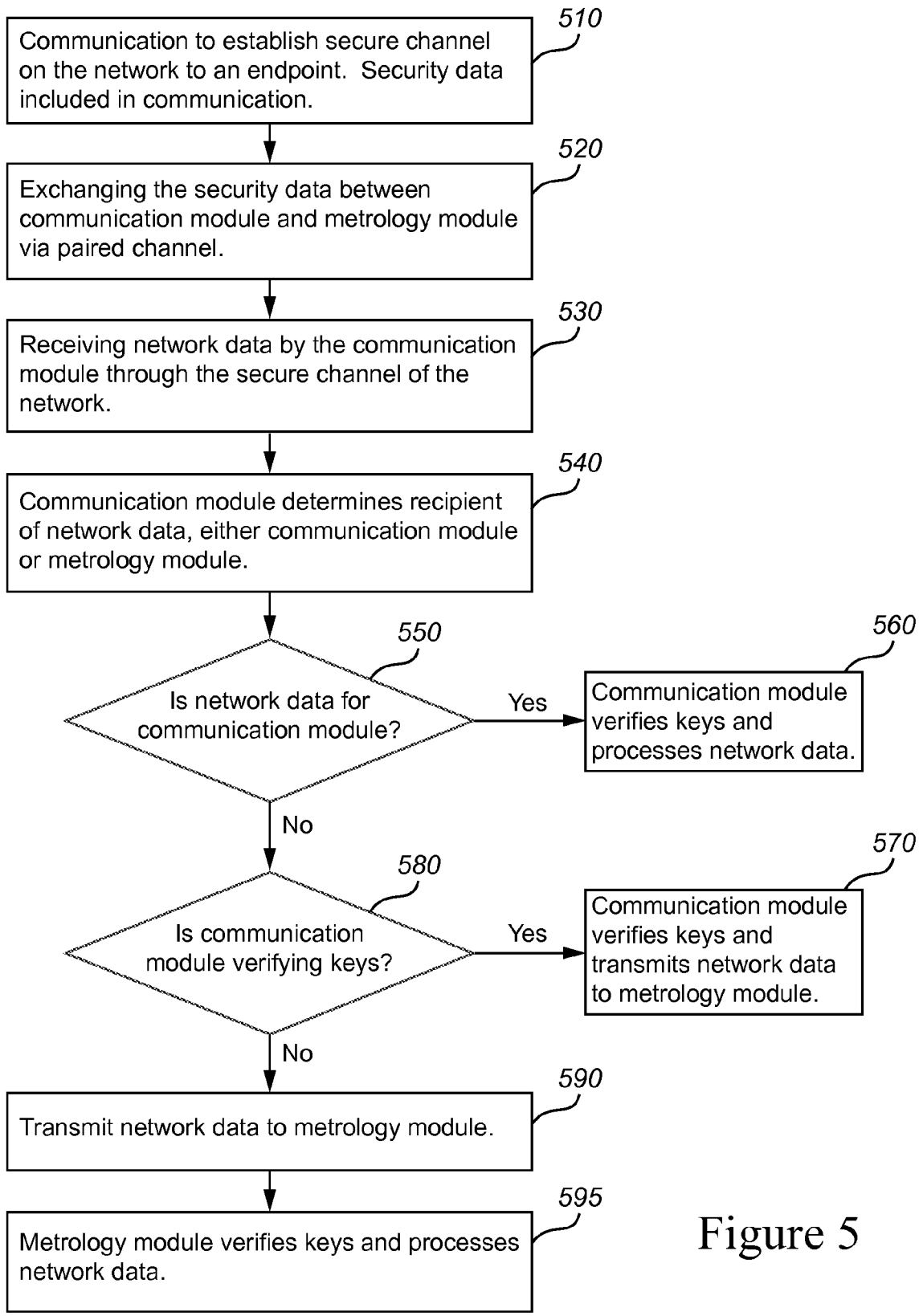
FIG. 5 is a flowchart illustrating how network data is processed when a secure communication is established between the head-end system and the metrology module of the endpoint.

Referring to FIG. 5, which shows how network data is received and processed by the communication module, the extension of secure communication within an endpoint 230 commences at 510 with a communication from the head-end system 110 to establish a secure channel on the network to an endpoint 230. This communication may contain security data such as keying data. Keying data comprises any information necessary for integrity checking or for the confidentiality of any information exchanged. Keying data may include but is not limited to encryption/decryption keys, integrity keys (i.e., authentication codes), endpoint message signing keys or endpoint message verification keys. At 520, the exchange of security data is performed between the communication module and the metrology module via the paired channel on the communication path. Once the secure channel is extended within the endpoint, the communication module may receive at 530 network data via the secure channel of the network. Network data may be any communication received by the communication module that is received via the secure channel on the network. The communication module determines the recipient of the network data at 540 and 550. In this example, the recipient may be either the communication module itself or the metrology module. In an alternative example where there are multiple metrology modules, the recipient may be either the communication module itself or any one of the metrology modules. If the network data is for the communication module then the communication module verifies keys such as signing keys or an authentication code and processes the network data at 560. Processing the network data may include decryption using a decryption key. If the network data is not for the communication module then the communication module determines if it is verifying keys at 580 before transmitting to the recipient. If the communication module verifies keys then it will do so on the network data and if keys are confirmed, the network data is sent to the metrology module at 570. Alternatively, if there are multiple metrology modules, the communication module may verify keys and proceed either by (1) determining from the network data the specific metrology module that is the intended recipient and transmit the network data to that recipient or (2) transmit the network data to all metrology modules. If the communication module does not verify keys then the network data is transmitted to the metrology module at 590. Alternatively, if there are multiple metrology modules and the communication module does not verify keys, the communication module may send the network data to each of the metrology modules and each metrology module would handle the network data accordingly. If a specific metrology module was not the intended recipient then that metrology module would discard the network data. If a specific metrology module was the intended recipient then that module would verify keys including but not limited to a signature key, any integrity key (authentication code), and will decrypt the message using a decryption key to process at 595.

Figure 6:
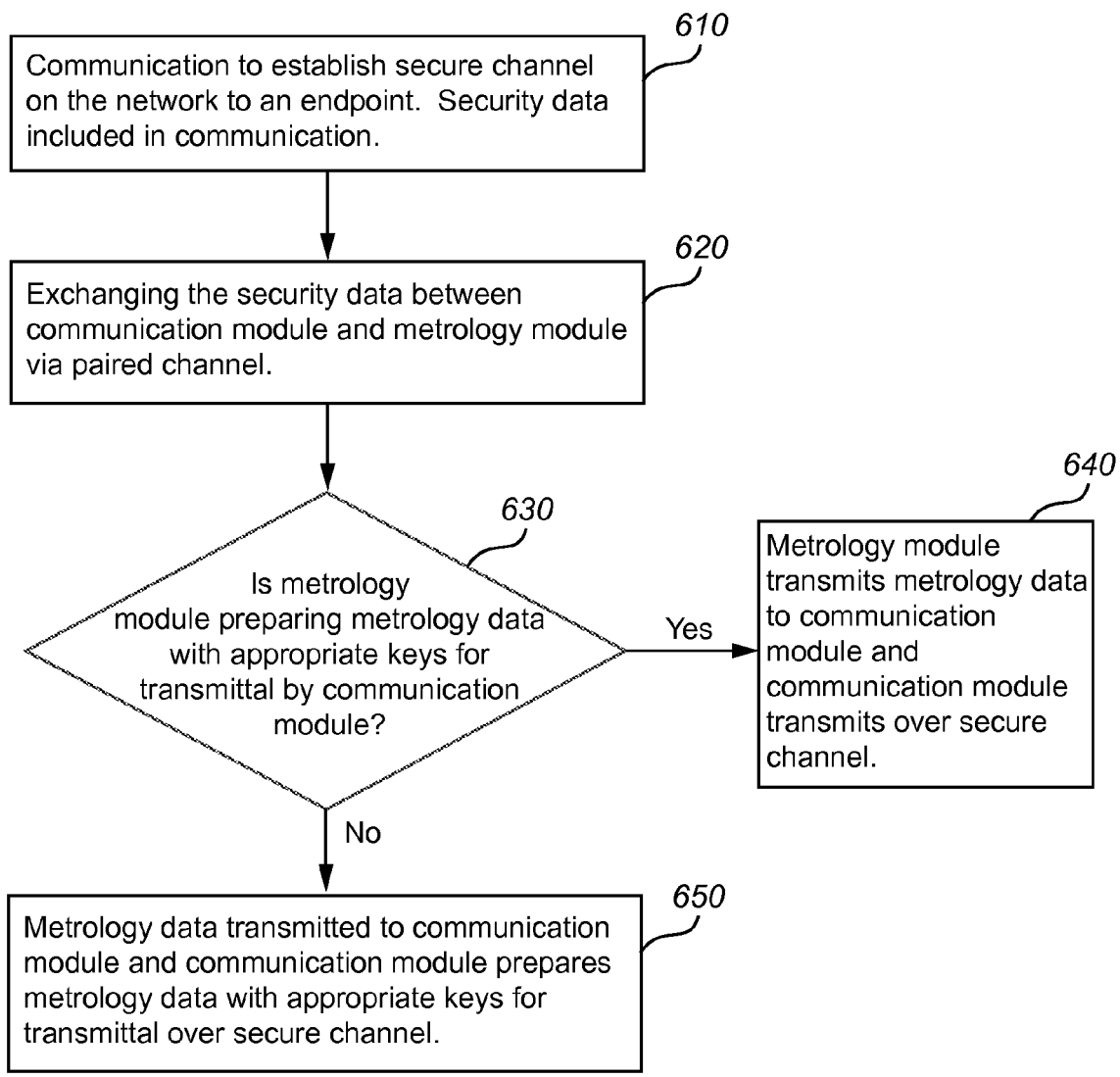
FIG. 6 is a flowchart illustrating how metrology data is processed when a secure communication is established between the head-end system and the metrology module of the endpoint.

Referring to FIG. 6, which shows how metrology data is sent over the secure channel, the extension of secure communication within an endpoint 230 commences at 610 with a communication from the head-end system 110 to establish a secure channel on the network to an endpoint 230. This communication may contain security data such as keying data. Keying data comprises any information necessary for integrity checking or for the confidentiality of any information exchanged. Keying data may include but is not limited to encryption/decryption keys, integrity keys (authentication codes), endpoint message signing keys or endpoint message verification keys. At 620, the exchange of security data is performed between the communication module and the metrology module via the paired channel on the communication path. Any one of the metrology modules may prepare the metrology data to send by encrypting the metrology data with the encryption key previously exchanged. Also, it may add any key necessary for integrity checking such as a verification key or authentication code. Once this is completed, the metrology module will transmit the metrology data to the communication module and the communication module will transmit the metrology data over the secure channel at 640. However, it is not necessary for the metrology module to prepare the metrology data prior to transmitting it to the communication module. The metrology module may transmit the metrology data to the communication module without any keying data other than the pairing key. In this example, the communication module would encrypt the data with the previously exchanged encryption key and add the keys necessary, such as but not limited to a verification key. Once this is completed, the metrology data is transmitted over the secure channel at 650.

In another example, network data received by the communication module may be distributed by default. In this example, any network data received by the communication module would be sent as is to all the metrology modules. Since the exchange of keying data would have established a paired channel, the metrology module would process all decryption and verification of keys necessary to process the network data. Likewise, to send metrology data, the metrology module would prepare metrology data with encryption and appropriate keys such as verification keys and transmit the metrology data to the communication module via the paired channel. The communication module would then transmit the metrology data as received via the secure channel.

The exchange of security data and establishing a pairing channel allows the processing of network data or metrology data to be processed in whole or in part by either the communication module or the metrology module. In other words, network data may be processed (decrypted and confirm keys) either completely by the communication module or completely by the metrology module. Also, the data may be processed in part by the communication module (i.e., decryption) and keys confirmed by the metrology module. Likewise, the transmittal of metrology data may be prepared (encryption and the insertion of keys) in whole or in part by the metrology module or the communication module. In addition, the processing of network data or metrology data in whole or in part by either the communication module or the metrology module does not affect any communication to or from the head-end system to the endpoint.

Note that any exchange of data between the communication module and the metrology module once the paired channel is established includes the pairing key. Hence any communication received by either module would be checked first to confirm the pairing key. If the pairing key does not match, the data sent may be discarded by the module receiving the data. In other words, if the pairing key does not verify, there is essentially no communication between the communication module and the metrology module.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. For example, although a metering implementation has been used for illustration, the invention may be extended to any type of network endpoint that includes a communication module and a second module, separate from the communication module.

The invention claimed is:

1. A method comprising:
   receiving a communication through a network by a communication module, wherein the network connects a plurality of endpoints, including a first endpoint associated with a first location that includes the communication module, a metrology module capable of measuring consumption of a resource at the first location, and a communication path between the communication module and the metrology module, wherein the communication module and the metrology module communicate using a secure paired channel on the communication path, wherein the secure paired channel was established by exchanging a pairing key between the communication module and the metrology module, wherein the communication contains security data sent to establish a secure channel between a central system and the communication module of the first endpoint and wherein the pairing key and the security data are distinct;
   using the pairing key to securely send the security data from the communication module to the metrology module by transmitting the security data through the secure paired channel within the first endpoint;
   receiving a second communication through the network by the communication module through the secure channel of the network; and
   using the pairing key to securely send the second communication received by the communication module to the metrology module through the secure paired channel within the first endpoint.

2. The method of claim 1 wherein the communication path includes a socket or a cable.

3. The method of claim 1 wherein the security data comprises at least one of the following an encryption/decryption key, an integrity key, a signing key, and a verification key.

4. The method of claim 1 wherein the secure paired channel is established through an acknowledgement of a pairing key between the communication module and the metrology module, the pairing key set during manufacture of the communication module and the metrology module, the pairing key acknowledged through the communication path.

5. The method of claim 1 further comprising transmitting by the communication module via the secure channel of the network any metrology data received from the metrology module through the secure paired channel.

6. A network endpoint device associated with a first location comprising:
   a communication module configured to communicate with a network and to communicate with a metrology module; and
   the metrology module configured to measure consumption of a resource at the first location;
   wherein the communication module and the metrology module are connected via a communication path within the network endpoint, the communication path providing a secure paired channel, the secure paired channel configured to provide protected communication within the network endpoint device between the communication module and the metrology module, wherein the secure paired channel was established by exchanging a pairing key between the communication module and the metrology module;
   wherein a communication is received by the communication module in the network endpoint device through the network requesting a secure channel to the network endpoint device, wherein the secure channel is established between the communication module and a device external to the network endpoint device through the use of security data, and wherein the pairing key and the security data are distinct; and
   wherein the pairing key is used to securely send the communication received by the communication module to the metrology module in the network endpoint device through the secure paired channel in the network endpoint device.

7. The device of claim 6, wherein the communication module comprises a communication device, a processor and memory.

8. The device of claim 7, wherein the network is a wireless network and the communication device comprises an antenna and a radio.

9. The device of claim 7, wherein the network is a wired network and the communication device communicates over the network using a power line carrier (PLC).

10. The device of claim 7, wherein the metrology module comprises measurement circuitry, a processor and memory.

11. The device of claim 7, further comprising wherein network data received through the secure channel by the communication module is transmitted to the metrology module via the secure paired channel.

12. The device of claim 7, further comprising wherein metrology data received by the communication module through the secure paired channel is transmitted via the network through the secure channel.

13. The device of claim 7, wherein the secure paired channel is setup through the exchange of pairing keys between the communication module and the metrology module.

14. A method for securely communicating with modules within a single endpoint associated with a first location, comprising:
   providing a pairing key at a communication module associated with the endpoint and the first location;

providing the pairing key at a second module associated with the endpoint and the first location, wherein the communication module and the second module communicate via a communication path that is within the endpoint using the pairing key;

receiving a communication by the communication module from a central system, wherein the communication is sent over a network and includes security data for establishing a secure channel across the network between the central system and the communication module of the endpoint;

using the pairing key to securely send the security data from the communication module to the second module across the communication path within the endpoint using the pairing key;

receiving a secure communication by the communication module through the secure channel of the network; and using the pairing key to securely send the secure communication received by the communication module to the second module across the communication path within the endpoint, wherein the pairing key and the security data are distinct.

15. The method of claim 14 wherein using the pairing key to securely send the secure communication received by the communication module to the second module across the communication path within the endpoint, comprises:

determining that the secure communication is intended for the second module before sending the secure communication to the second module.

16. The method of claim 14 further comprising:

sending a response communication, the response communication responding to the secure communication, from the second module to the communication module using the pairing key, wherein the response communication includes a signing key that may be used to verify that the response communication originated from the endpoint; and transmitting the response communication by the communication module through the secure channel of the network.

17. The method of claim 14 further comprising:

sending a response communication, the response communication responding to the secure communication, from the second module to the communication module using the pairing key;

including a signing key that may be used to verify that the response communication originated from the endpoint in the response communication by the communication module; and transmitting the response communication, including the signing key from the communication module through the secure channel of the network.

18. The method of claim 14 further comprising:

sending a response communication, the response communication responding to the secure communication, from the second module to the communication module using the pairing key, wherein the response communication includes an encryption/decryption key and an integrity key that may be used to verify that the response communication was not altered; and transmitting the response communication by the communication module through the secure channel of the network.

* * * * *